United States Patent [19]

Horikoshi et al.

[11] 3,940,741
[45] Feb. 24, 1976

[54] INFORMATION PROCESSING DEVICE FOR PROCESSING INSTRUCTIONS INCLUDING BRANCH INSTRUCTIONS

[75] Inventors: Hisashi Horikoshi, Tachikawa; Shun Kawabe, Hachioji, both of Japan

[73] Assignee: Hitachi, Ltd., Japan

[22] Filed: July 5, 1973

[21] Appl. No.: 376,275

[30] Foreign Application Priority Data
July 5, 1972 Japan.............................. 47-66680

[52] U.S. Cl. ............................................ 340/172.5
[51] Int. Cl.² ........................................... G06F 9/20
[58] Field of Search ................................. 340/172.5

[56] References Cited
UNITED STATES PATENTS

| 3,551,895 | 12/1970 | Driscoll, Jr. | 340/172.5 |
|---|---|---|---|
| 3,562,713 | 2/1971 | Packard | 340/172.5 |
| 3,614,740 | 10/1971 | Delagi et al. | 340/172.5 |
| 3,614,747 | 10/1971 | Ishihara et al. | 340/172.5 |
| 3,634,883 | 1/1972 | Kreidermacher | 340/172.5 |
| 3,713,108 | 1/1973 | Edstrom et al. | 340/172.5 |
| 3,774,166 | 11/1973 | Vigliante | 340/172.5 |

Primary Examiner—Gareth D. Shaw
Assistant Examiner—John P. Vandenburg
Attorney, Agent, or Firm—Craig & Antonelli

[57] ABSTRACT

An information processing device for processing instructions, including branch instructions, is characterized in that a route memory is provided for storing branch target addresses of a plurality of branch instructions and branch target instructions in corresponding relationship to the branch target addresses, and the route memory is referenced by the address in a given instruction, whereby the branch target instruction at the corresponding branch target address is read out.

10 Claims, 10 Drawing Figures

INFORMATION PROCESSING DEVICE FOR PROCESSING INSTRUCTIONS INCLUDING BRANCH INSTRUCTIONS

BACKGROUND OF THE INVENTION

The present invention relates to an information processing device in an electronic computer, capable of processing instructions including branch instructions.

Pipe-line control systems have been known in the art, which process branch instructions at very high speeds.

In these systems, a minimum of four cycles are required for the processing, beginning with the decoding of the presence of a branch instruction until the decoding of a branch target instruction, which is stored at a branch target address in the branch instruction.

If a cache memory is provided and the branch target instruction is present in the cache memory, the instruction processing would require several cycles, such as the cycle for providing an effective branch target address, the cycle for referencing a cache index memory, the cycle for reading the branch target instruction at the branch target address from the cache memory, and the cycle for decoding the read instruction.

If the branch target instruction at the corresponding branch target address is not present in the cache memory or the cache memory itself is not provided, a larger number of cycles is needed. In the prior art, therefore, a considerable amount of time has been necessary for instruction processing, which has hampered an electronic computer from operating at a greater processing efficiency.

Generally, in the pipe-line control system, information processing is carried out through a prediction as to whether the branch is established or not. If the prediction is wrong, the processing in progress is cancelled and an additional number of cycles becomes necessary.

SUMMARY OF THE INVENTION

A principal object of the invention is to provide an information processing device capable of processing branch instructions with a minimum number of cycles.

Another object of the invention is to provide an information processing device capable of accurately predicting whether the branch is established or not.

BRIEF DESCRIPTION OF THE DRAWINGS

FIG. 8 for the referencing operation, FIG. 9 for the reading operation, and FIG. 10 for the completion operation.

DETAILED DESCRIPTION OF THE INVENTION

Figure 1:
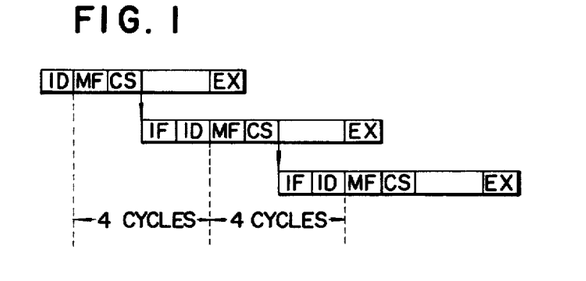
FIG. 1 is a diagram showing the flow of branch instruction processing in the prior art.

Referring to FIG. 1, there is shown the flow of branch instruction processing in the prior art, in which three branch instructions are processed in succession as a result of the branch being established. As shown in FIG. 1, the following four cycles are necessary to complete the operation beginning with the decoding of the presence of a branch instruction until the decoding of the branch target instruction.

1. MF: the cycle for establishing the effective branch target address.
2. CS: the cycle for referencing the cache index memory in order to detect whether or not the branch target instruction at the corresponding branch target address is present in the cache memory (when the cache memory is used).
3. IF: the cycle for reading out the branch target instruction from the cache memory when such instruction is present in the cache memory.
4. ID: the cycle for decoding the instruction which has been read.

Note: EX is the cycle for executing the instruction.

These cycles are for the system provided with a cache memory and for the instance that a branch target instruction is present in the cache memory. If the branch target instruction at the corresponding branch target address is not present in the cache memory or the cache memory itself is not provided, the instruction should be read through direct access from the main memory and, hence, a far larger number of cycles will become necessary.

In any case, at least four cycles per instruction are required for the execution of branch instructions. In the prior art, it has been impossible to reduce the number of cycles, or it has been inevitable that the instruction processing takes a considerable amount of time.

Figure 2:
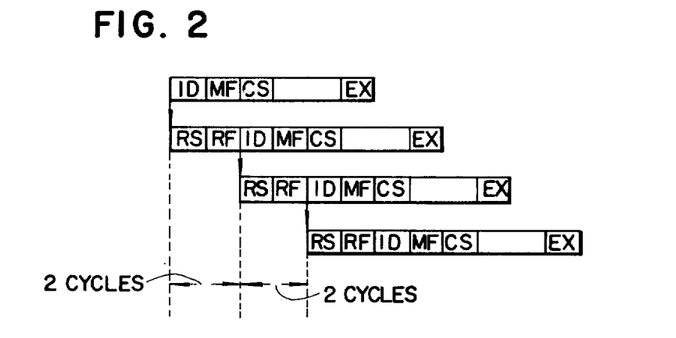
FIG. 2 is a diagram showing the flow of branch instruction processing according to the invention.

FIG. 2 is a diagram useful for illustrating one principle of the invention in connection with processing of four branch instructions in succession on condition that the branch is established. From the flow shown in FIG. 2, it is apparent that only two cycles per instruction are sufficient for the execution of branch instructions according to the invention.

1. RS: the cycle for referencing the route index memory simultaneously when the decoding of a branch instruction starts, to detect whether or not the branch target instruction at the corresponding branch target address indicated in the branch instruction is registered in the route buffer memory.
2. RF: the cycle for reading out the branch target instruction from the route buffer memory in case such an instruction is registered in the route buffer memory.

At the beginning of cycle RS, it is unknown whether the given instruction is a branch instruction. Accordingly, the route buffer memory is referenced with respect to all the instructions. When it is found that the given instruction is not a branch instruction, the next cycle RF is not executed but an ordinary instruction read operation is carried out.

In this manner, the processing of a branch instruction can be performed in two cycles. k Briefly, the invention has its principal feature in the provision of a route memory comprising a route index memory and a route buffer memory wherein the branch target address corresponds to the branch target instruction.

Another feature of the invention lies in that a predicting bit based on the past data is provided for the route index memory in order to improve on the prediction as to whether the branch is established or not.

Figure 3:
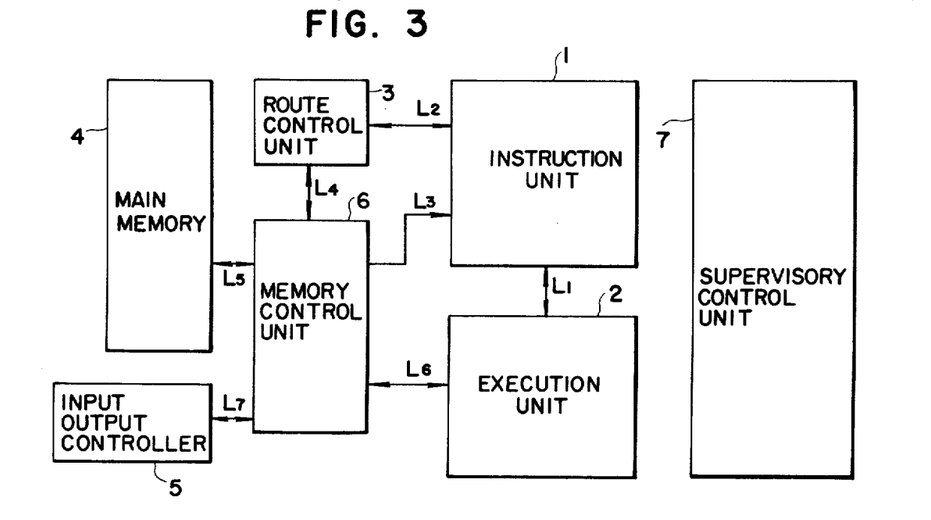
FIG. 3 is a block diagram showing an information processing device of this invention.

FIG. 3 is a block diagram showing the constitution of an information processing device of the invention, which consists essentially of seven components as follows:

1. Instruction Unit 1: This unit picks up an instruction in advance and decodes it.
2. Execution Unit 2: This unit executes an instruction.
3. Route Control Unit 3: This uniit includes the route memory of this invention and controls this route memory.
4. Main Memory 4.
5. Input Output Controller 5.
6. Memory Control Unit 6: This unit includes a cache memory and controls the reference to the main memory 4 from the instruction unit 1, execution unit 2, input-output controller 5 and route control unit 3.
7. Supervisory Control Unit 7.

In FIG. 3, L1 through L7 represent control lines and data lines for connections among the units 1 and 6. The supervisory control unit 7 governs the control of all associated units. A description of these functions is not essential to an understanding of the invention and, therefore, the description thereof is omitted.

Figure 4:
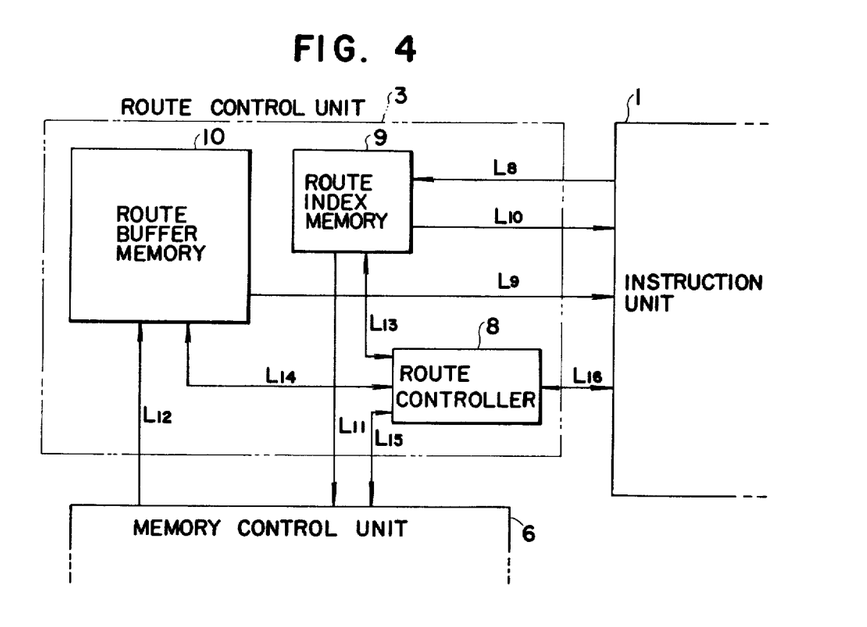
FIG. 4 is a block diagram showing the construction of the route control memory as in FIG. 3.

FIG. 4 is a diagram showing in concrete form the route control unit 3 in FIG. 3. This unit consists essentially of the following three components:

1. Route Controller 8.
2. Route Index Memory 9.
3. Route Buffer Memory 10.

This control system is operated in the following manner: The route index memory 9 is referenced by the address in the instruction supplied from the instruction unit 1 through the line L8. When this reference reveals the presence of a branch target instruction corresponding to the given branch target address of the branch instruction, this branch target instruction is read out from the route buffer memory 10 and transferred to the instruction unit 1 through the line L9. At the same time, the prediction data obtained from the corresponding predicting bit of the route index memory 9, indicating whether the branch is established or not, is supplied to the instruction unit 1 through the line L10.

All the addresses in the instructions including the branch instruction are supplied to the route index memory 9 through the line L8, and the reference to the route index memory 9 is performed. At the same time, this address is supplied to the memory control unit 6 through the line L11, and the data is read from the cache memory or from the main memory in the ordinary manner. The instruction which has been read therefrom is sent to the route buffer memory 10 through the line L12 whereby the instruction stored in the route buffer memory is rewritten, or this instruction is sent to the instruction unit 1 through the line L9.

The route controller 8 controls these operations through the control lines L13 to L16.

The relationship between the route buffer memory 10 and the route index memory 9 is such that when data coincident with the branch target address from the instruction unit 1 is present in the route index memory 9, the branch target instruction at the branch target address in the corresponding cell of the route buffer memory 10 is delivered as an output.

Figure 5:
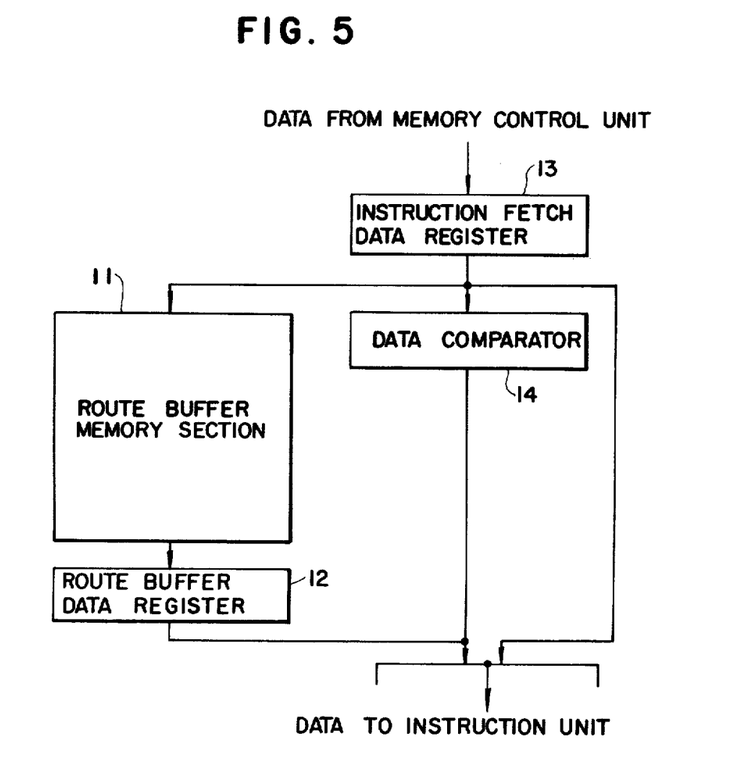
FIG. 5 is a block diagram showing a concrete example of the construction of the route index memory in FIG. 4.

FIG. 5 is a diagram showing a concrete example of the construction of the route buffer memory 10 of FIG. 4. This buffer memory consists essentially of the following four components:

1. Route Buffer Memory Section 11: This section stores the branch target instruction.
2. Route Buffer Data Register 12: This register stores the instruction read from the route buffer memory section 11.
3. Instruction Fetch Data Register 13: This register stores the instruction supplied from the memory control unit 6.
4. Data Comparator 14: There may be need of modifying the branch target instruction once transferred to the route buffer memory section 11 or of modifying the branch target address during its processing. Therefore, even if there is a corresponding instruction in the route buffer memory section 11, the corresponding instruction in the cache memory or in the main memory is read by the memory control unit 6 in the ordinary route, and then this instruction and the instruction from the route buffer memory section 11 are compared with each other.

Figure 6:
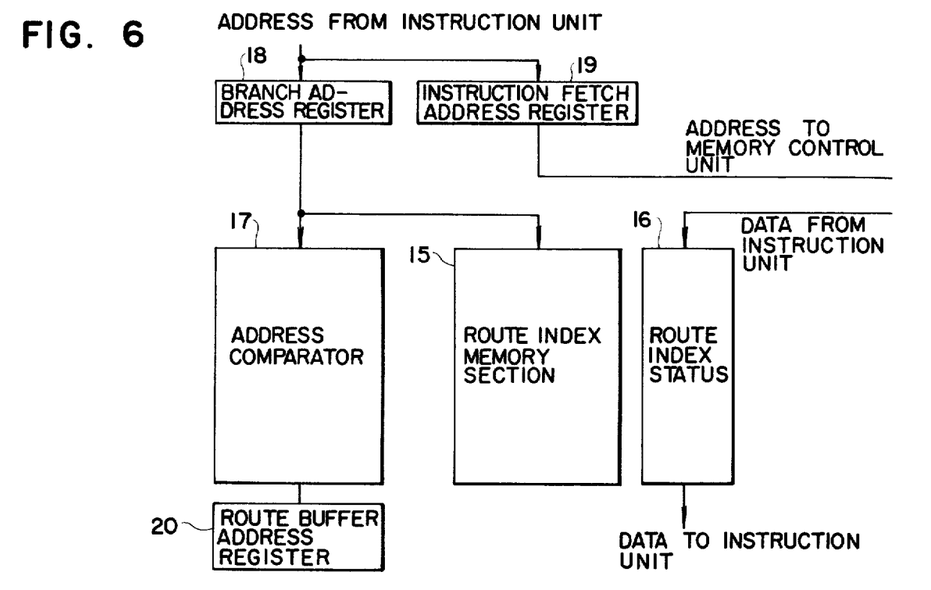
FIG. 6 is a block diagram showing a concrete example of the construction of the route buffer memory in FIG. 4.

FIG. 6 is a diagram showing in detail an example of the construction of the route index memory 9 of FIG. 4, which comprises the following six components:

1. Route Index Memory Section 15: This section stores the branch target address (in the main memory) of the branch target instruction stored in the route buffer memory section 11. Through the route index memory section 15 and the route buffer memory section 11, the branch target address of a branch instruction corresponds to the branch target instruction.
2. Route Index Status 16: This status consists of the following three bits by which the status of the corresponding term of route index memory section 15 and route buffer memory section 11 are specified.
   a. Validity Bit V: This bit indicates whether the term is valid or not. When validity is found, the corresponding instruction is read from the route buffer memory section 11.
   b. Activity Bit A: When reference is made, the corresponding term turns into "1". When all terms become "1", they are cleared to "0". This bit is used to determine the term which is to be removed from the route memory. This bit is preferentially removed from the "0" term.
   c. Establish Bit E: This bit indicates whether or not the branch is established when the term was used previously. In other words, this bit is the predicting bit which is to predict whether or not the branch is established when this term is used the next time.
   Of these bits, the establish bit E is additionally used for the purpose of this invention.
3. Address Comparator 17: Of the terms of route index memory section 15, the one in which the validity bit V of route index status 16 is "1" (i.e., this term is valid) is compared with the address supplied from the instruction unit 1. This unit, together with the route index memory section 15, constitutes a group of associative registers.
4. Branch Address Register 18: This register stores the address in a branch instruction from the instruction unit 1. Accordingly, this register stores the addresses of all instructions.

5. Instruction Fetch Address Register 19: This register stores the address in an instruction from the instruction unit 1.

6. Route Buffer Address Register 20: This register stores the address for which coincidence is reached as a result of comparison between the address of the branch address register 18 and the address of the route index memory section 15. This address serves also as the address of the route buffer memory section 11.

The operation of the route control unit 3 will be described below by referring to FIGS. 5 and 6. This operation consists essentially of three operations: referencing operation, reading operation, and completion operation as follows:

1. Referencing or Referring Operation

Reference is made at the same time the instruction is decoded in the instruction unit 1. When the corresponding branch target instruction is present, this instruction is supplied to the instruction unit 1. At the same time, the content of the establish bit E of the route index status 16 is given to the instruction unit 1 and, thus, a prediction is made as to whether or not the branch is established.

2. Reading Operation

This is an ordinary instruction reading operation performed in parallel with the referencing operation. Even when the branch target intruction word has been obtained by the referencing operation, the same instruction is read. These operations are performed via an order from the instruction unit 1.

The reading operation is performed for three purposes as follows:
a. To read an ordinary instruction.
b. To supply a new instruction to the route buffer memory 10 when an instruction in this memory has been modified.
c. To make a new registration of a branch target instruction when there is an unregistered branch target instruction in the route buffer memory 10.

3. Completion Operation

The route control unit receives the data of the final status of the branch instruction which has been executed between the instruction unit 1 and the execution unit 2, i.e., the data as to whether the branch is established or not. Then the route control unit modifies the establish bit E of the route index status 16.

Figure 7:
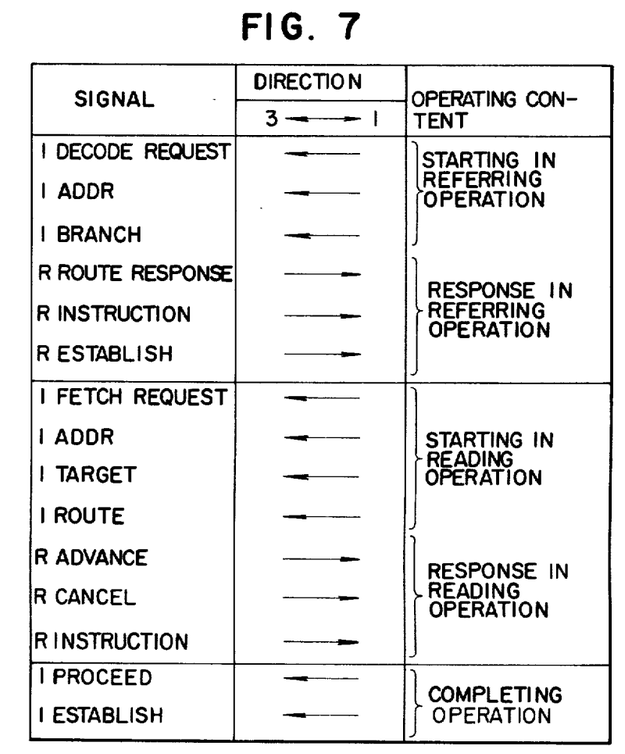
FIG. 7 is a diagram showing signals exchanged between the route control unit and the instruction unit according to the invention.

Referring to FIG. 7, there is illustrated the relationship between signals exchanged between the route control unit 3 and the instruction unit 1, in connection with the referencing operation, reading operation and completion operation.

Basically, a branch instruction is processed under the control of (1) referencing operation, (2) reading operation, and (3) completion operation. In a machine or system operated under sophisticated advanced control, a series of branch instructions are very likely to occur. In such an event, the referencing operation will start for the succeeding branch instruction before the completion operation for the previous branch instruction is finished. To prevent this problem, it is necessary to provide a certain number of stacks in the route control unit 3. For the sake of explanatory simplicity, it is assumed in this specification that the processing of the succeeding branch instruction does not start until the three control operations for the preceding branch instruction are completed.

Figure 8:
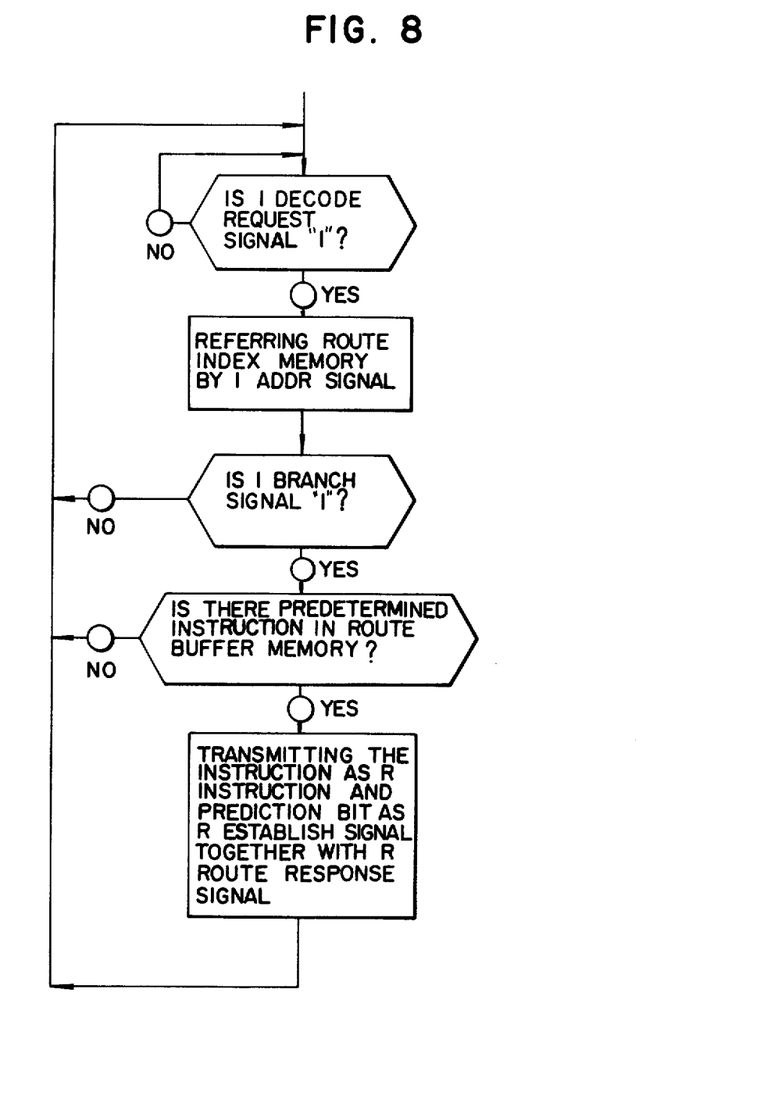
FIGS. 8 through 10 are flow charts useful for illustrating the operations of the devices shown in FIGS. 4 through 6.

FIG. 8 is a flow chart showing the outline of the referencing operation, which is carried out in the following order:

1. The instruction unit 1 sends to the route controller 8 an I decode request signal, informing it that the instruction decoding stage of the instruction unit 1 is in operation. At the same time, the instruction unit 1 transmits the address in the instruction being decoded as an I ADDR signal. This address is stored in the branch address register 18 and in the instruction fetch address register 19.

2. The address comparator 17 compares the address stored in the branch address register 18 with the address of the route index memory section 15 where the validity bit V of the route index status 16 is "1". Thus, the route index memory 9 is referenced to check whether or not the instruction corresponding to the address from the instruction unit 1 is present in the route buffer memory section 11.

3. As a result of the decoding of the instruction unit 1, it is determined whether or not this instruction is a branch instruction. This result is supplied as an I branch signal to the route controller 8. If the I branch signal does not appear within a given period of time after the arrival of the I decode request signal, the route controller 8 assumes that the instruction being decoded is not a branch instruction and, therefore, stops referencing the route index memory 9. If the I branch signal arrives in a given time, the route controller 8 continues referencing the route index memory 9.

4. If the coincident address is detected in the route index memory section 15 as a result of referencing the route index memory 9, this address is supplied to the route buffer address register 20. At the same time, the corresponding branch target instruction in the route buffer memory section 11 is read out to the route buffer data register 12. The read data is supplied as an R instruction signal to the instruction unit 1. On this occasion, the route controller 8 supplies an R route response signal to the instruction unit 1. On the other hand, the content of the establish bit E of the route index status 16, which corresponds to the coincident branch target address, is supplied as an R establish signal to the instruction unit 1. If no address coincident with the branch target address in the branch instruction is present in the route index memory section 15, the route control unit 3 does not effect a response and the instruction unit 1 assumes that the branch target instruction is not present in the route buffer memory 10.

The instruction unit 1 makes a prediction, according to the R establish signal, as to whether the branch is established or not.

The foregoing is the referring or referencing operation.

Figures 9, 10:
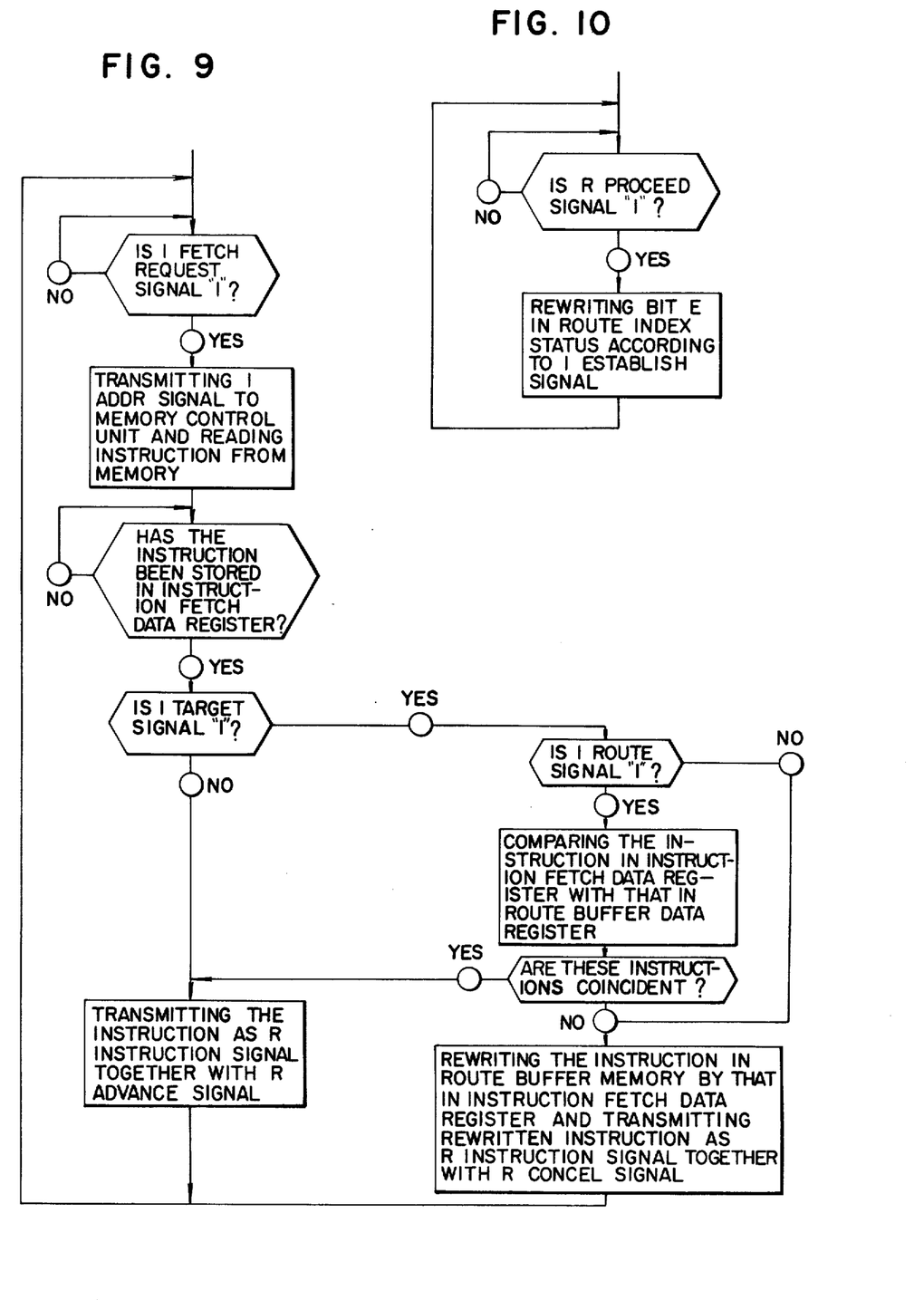

FIG. 9 is a flow chart showing the outline of the reading oepration.

In the reading operation, not only the branch target instruction at the branch target address, but also ordinary instructions are read.

It is in the following cases that the instruction unit 1 sends out and I fetch request signal and starts reading the instruction:

a. Reading of all ordinary instructions.
b. Reading of a branch target instruction.

In this case, an I target signal is set. Even if an instruction is obtained from the route memory, reading is executed to check whether the instruction is correct.

The reading operation is performed in the following order:

1. When an I fetch request signal "1" is supplied to the route controller 8 from the intruction unit 1, the I ADDR signal which has been fetched in the instruction fetch address register 19 is sent to the memory control unit 6 to require this memory control unit to read the instruction. When the memory control unit 6 completes reading data from the cache memory or from the main memory 4, the read data is set into the instruction fetch data register 13, and the data exchange between the instruction unit 1 and the memory control unit 6 is completed.

2. When the I target signal is "O", this means the ordinary instruction reading. Then, the route controller 8 sends an R advance signal to the instruction unit 2. At the same time, the instruction read out to the instruction fetch data register 13 is supplied as an R instruction signal to the instruction unit 1.

(3) When the I target signal "1" is sent from the instruction unit 1, this means the reading of the branch target instruction. Therefore, the route controller 8 sees the I route signal. This I route signal indicates whether or not the read branch target instruction is registered in the route buffer memory section 11. If the I route signal is "O", it is not registered therein. Then, after its registration, the content of the instruction fetch data register 13, together with the R cancel signal, is supplied as an R instruction signal to the instruction unit 1.

4. When the I target signal is "1" and the I route signal is "1", it is to check the coincidence between the instruction (though this instruction is registered) and the instruction which is read to the instruction fetch data register 13. The instruction read from the route buffer register 12 is compared with the instruction of the instruction fetch data register 13 by the data comparator 14. When coincidence is detected, no modification is needed. Then the instruction, together with the R advance signal, is supplied as an R instruction signal to the instruction unit 1. If the comparison results in discoincidence, the data is re-registered in the route buffer memory section 11. The instruction, together with the R cancel signal, is supplied as an R instruction signal to the instruction unit 1.

The following cases are considered as the cause of the discoincidence between the instructions:

a. The route of a branch has been changed and the branch target address has been changed.

b. The branch target instruction at the branch target address has been rewritten.

These events would often occur and, hence, it is necessary to check the data coincidence and discoincidence. If discoincidence is encountered, the instruction unit 1 invalidates the advanced control.

It is important to determine which part of the existing data is to be removed when the new data is re-registered in the route memory.

To this effect, a method of LRU (Least Recently Used) in which the data are ousted in order beginning with the data which has been least recently used, or a method of FIFO (First In First Out) in which the data are removed in order "first in first out" is generally used. In this example, the LRU method using an active bit A is employed.

The reading operation has been described above.

FIG. 10 is a flow chart showing the outline of the completion operation.

The purpose of the completing operation is to control the establish bit E in the route index status 16. The data as to whether the branch has been established or not is supplied as an I establish signal, together with an I proceed signal, to the route controller 8 from the instruction unit 1 whereby the bit E in the route index status 16 is rewritten.

Devices and control lines for various controls are not shown in FIGS. 5 and 6 because they are not essential for the purpose of understanding the invention and can easily be realized by those skilled in the art.

According to the present invention, as has been described above, the branch instruction processing time is markedly reduced by providing a route memory in which the branch target address corresponds to the branch target instruction at the branch target address. Furthermore, it can be accurately predicted whether the branch is established or not, by disposing a predicting bit therein.

What is claimed is:

1. An information processing device comprising, in combination:

a route memory which includes
route index memory means for storing branch target addresses of a plurality of branch target instructions, and
route buffer memory means for storing branch target instructions at the corresponding branch target addresses stored in said route index memory;

instruction unit means for picking up and decoding an instruction to be processed;

referencing means, connected to said instruction unit and said route memory, for referencing the route index memory means by the address of the instruction to be processed from said instruction unit means when the decoding of the instruction is started by said instruction unit means, to detect the branch target address in said route index memory means coincident with the address of the instruction to be processed; and read-out means, connected to said route memory and said instruction unit means, for reading out the branch target instruction corresponding to the branch target address detected by said referencing means and for transferring the branch target instruction read-out from said route buffer memory means to said instruction unit means.

2. An information processing device in accordance with claim 1, in which said route memory is provided with a predicting bit corresponding to each branch targer address, which predicting bit indicates whether or not the branch is established to the branch traget instruction corresponding to each branch target address, and which further includes transfer means, connected to said route memory and said instruction unit means, for transferring the predicting bit, corresponding to the branch target address coincident with the address of the instruction to be processed, to said instruction unit means.

3. An information processing device in accordance with claim 1, in which said referencing means comprises register means, connected to said instruction unit means, for storing the address of the instruction to be processed, and comparator means, connected to said register means and said route memory, for comparing the address stored in said register means with that stored in said route index memory means.

4. An information processing device in accordance with claim 3, in which said route index memory means further comprises a predicting bit for indicating a branch establishing state of each address stored in said route index memory means, and which further includes transfer means, connected to said route memory and said instruction unit means, for transferring the predicting bit, corresponding to the branch target address coincident with the address of the instruction to be processed, to said instruction unit means.

5. An information processing device in accordance with claim 1, in which said read-out and transfer means comprise register means, connected to said route memory and said instruction unit means, for storing the branch target instruction which is read-out from said route buffer memory means, corresponding to the branch target address for which coincidence is detected, to transfer said branch target instruction to said instruction unit means.

6. An information processing device in accordance with claim 1, which further comprises memory means for storing instructions, memory control unit means, connected to said memory, for reading out from said memory means the instruction stored at the address of the instruction to be processed, instruction transfer means, connected to said memory control unit means, said instruction unit means and said route memory, for transferring the instruction read out from said memory means to said instruction unit means and to said route buffer memory means, and execution unit means, connected to said instruction unit means, for executing the instructions read out from said route buffer memory means and said memory means to said instruction unit means.

7. An information processing device in accordance with claim 6, in which said instruction transfer means comprises instruction fetch register means, connected to said memory means, for storing the instruction read out from said memory means, data comparator means, connected to said instruction fetch register means and said route memory means, for comparing the instruction stored in said instruction fetch register means with the instruction stored in said route buffer memory means corresponding to the address of the instruction to be processed, storage means, connected to said instruction fetch register means and said route memory, for storing the instruction from said instruction fetch register means in the route buffer memory means corresponding to the address for which discoincidence is detected as a result of a comparison by said data comparator means and transferring means, connected to said instruction fetch register means and said instruction unit means, for transferring the instruction stored in said instruction fetch register means to said instruction unit means.

8. An information processing device in accordance with claim 6, in which said route memory is provided with a predicting bit corresponding to each branch target address, which bit indicates whether or not the branch is established to the branch target instruction corresponding to each branch target address, and which further includes transferring means, connected to said route memory and said instruction unit means, for transferring the predicting bit, corresponding to the branch target address coincident with the address of the instruction to be processed, to said instruction unit means.

9. An information processing device in accordance with claim 7, in which said referencing means comprises a first register means, connected to said instruction unit means, for storing the address of the instruction to be processed, and comparing means, connected to said first register means and said route memory, for comparing the address in said first register means with that stored in said route index memory means.

10. An information processing device in accordance with claim 9, in which said read-out means comprises second register means, connected to said route memory and said instruction unit means, for storing the branch target instruction which is read out from said route buffer memory means, corresponding to the branch target address for which coincidence is detected, to transfer said branch target instruction to said instruction unit means.

* * * * *